Figure 10:
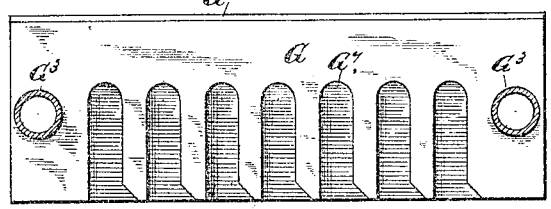

No. 644,762. Patented Mar. 6, 1900.
J. T. CARMODY.
MACHINE FOR MAKING EGG CASE FILLERS.
(Application filed Mar. 20, 1899.)
(No Model.) 9 Sheets—Sheet 1.
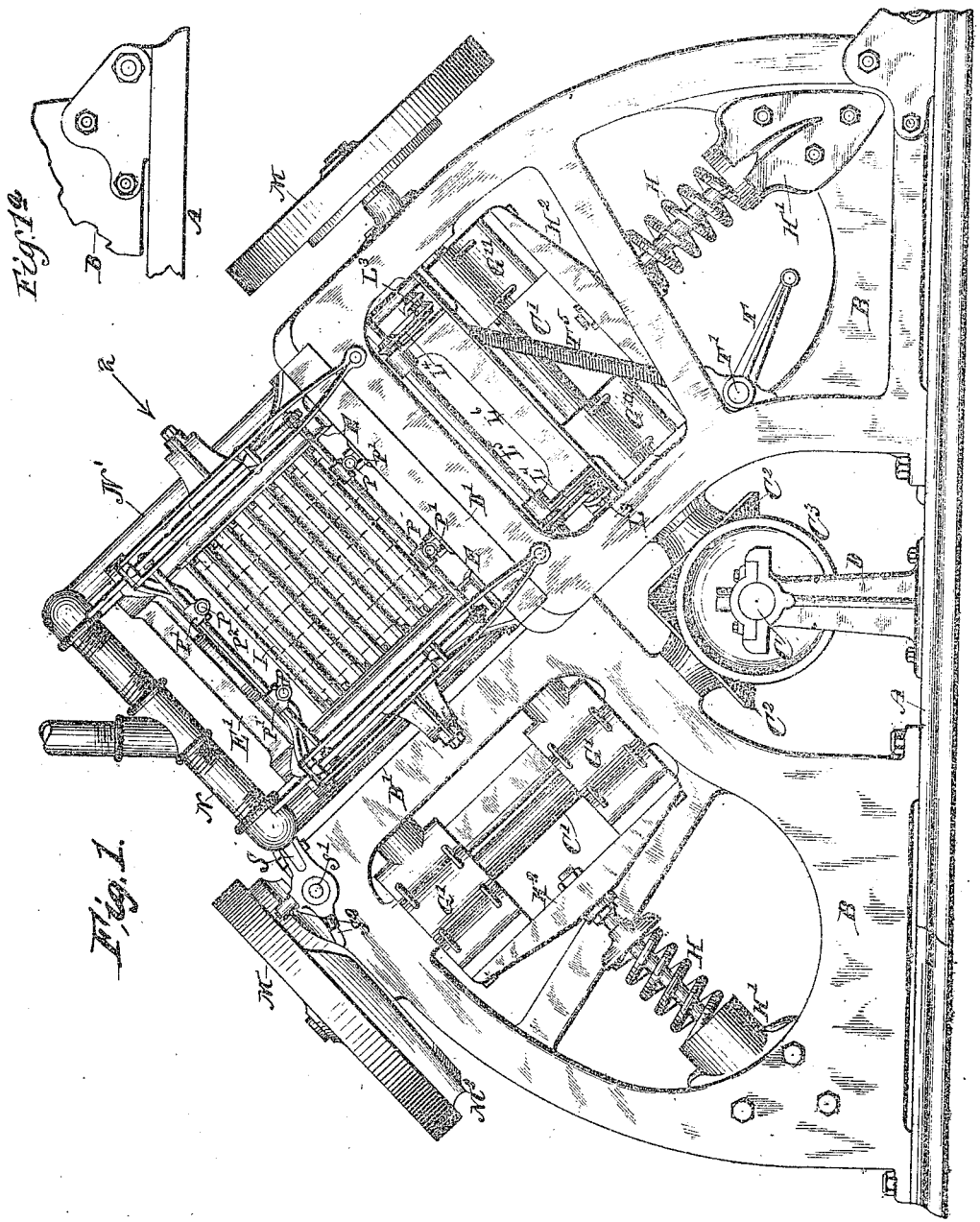
Witnesses:
Wm. M. Rheem
Edward T. Barrett
Inventor,
John T. Carmody
By Gridley & Hopkins
Attys.

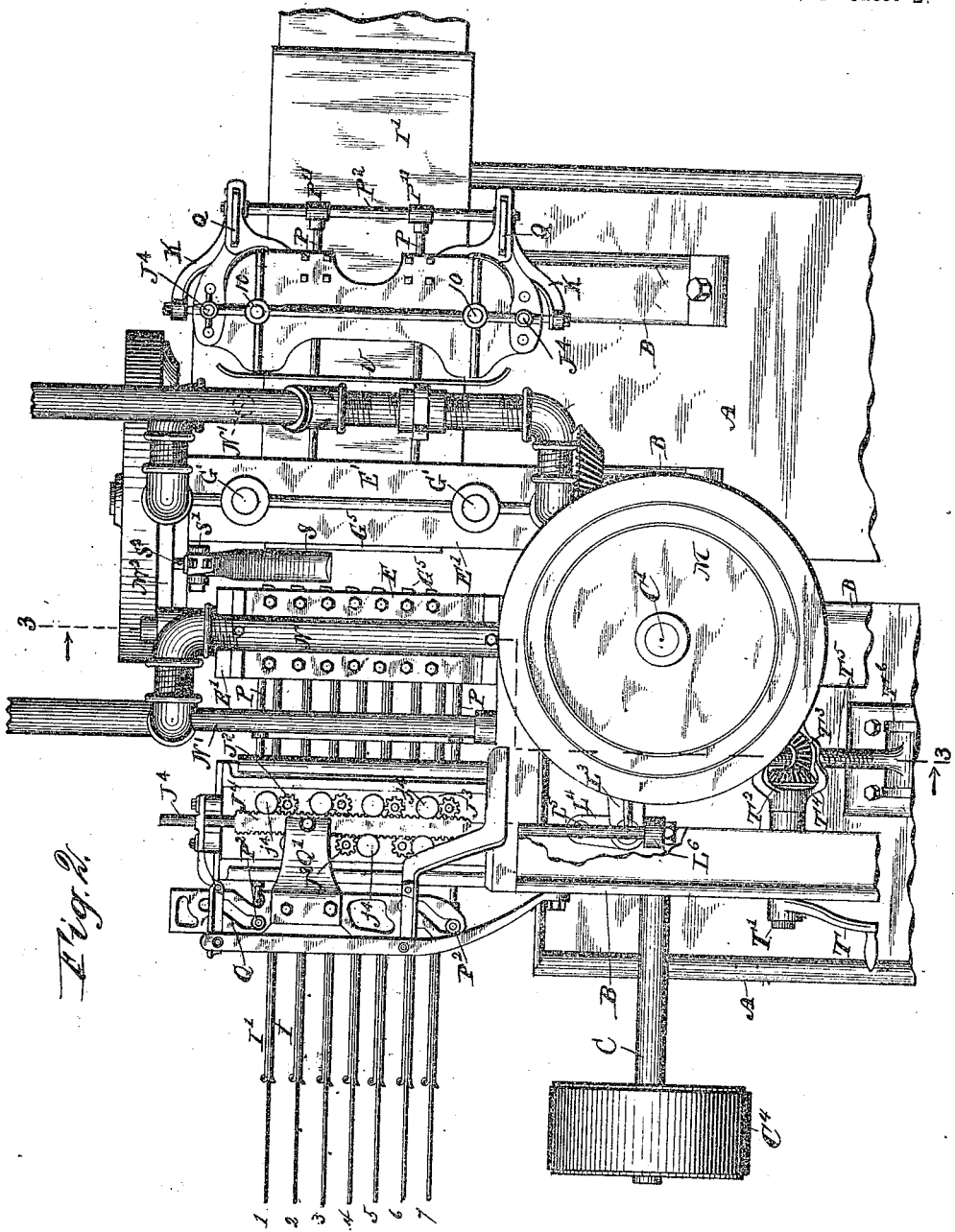

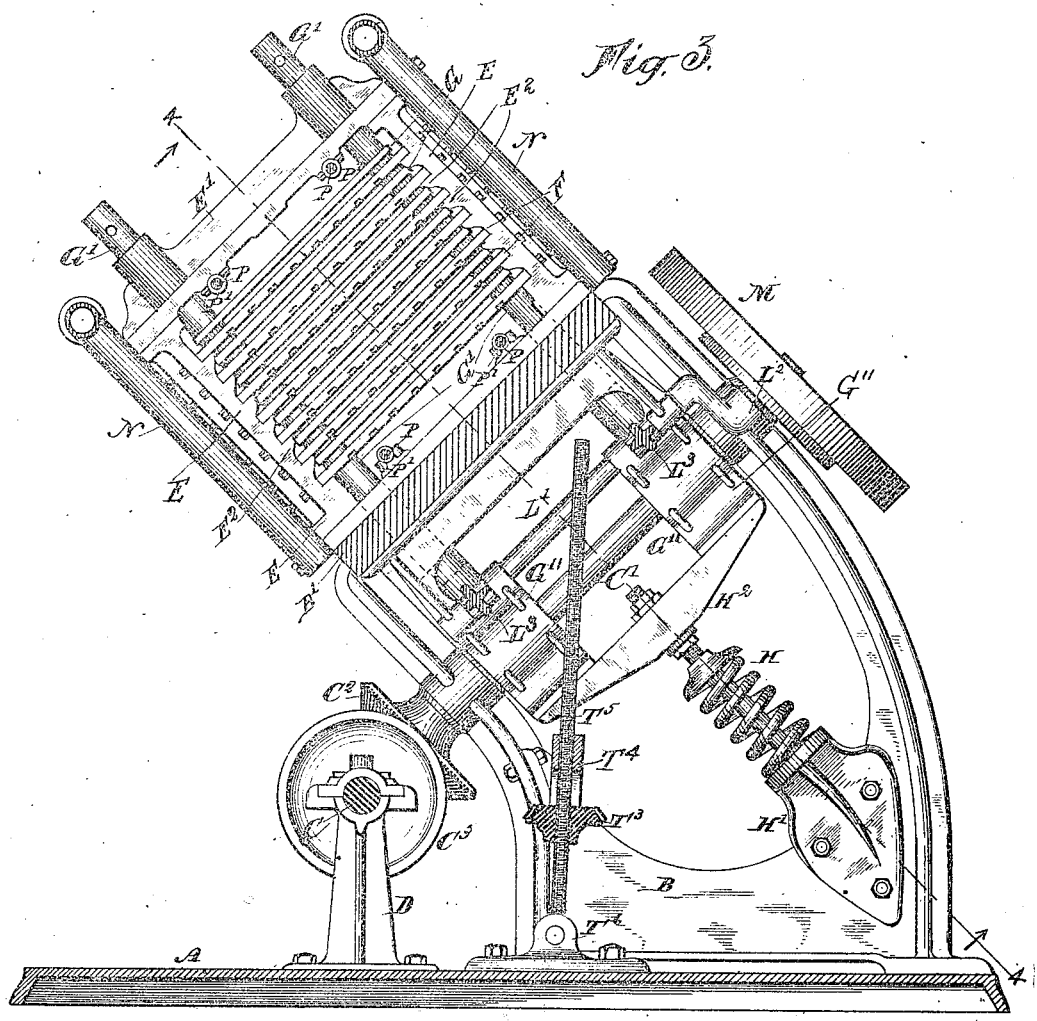

No. 644,762. Patented Mar. 6, 1900.
J. T. CARMODY.
MACHINE FOR MAKING EGG CASE FILLERS.
(Application filed Mar. 20, 1899.)
(No Model.) 9 Sheets—Sheet 4.
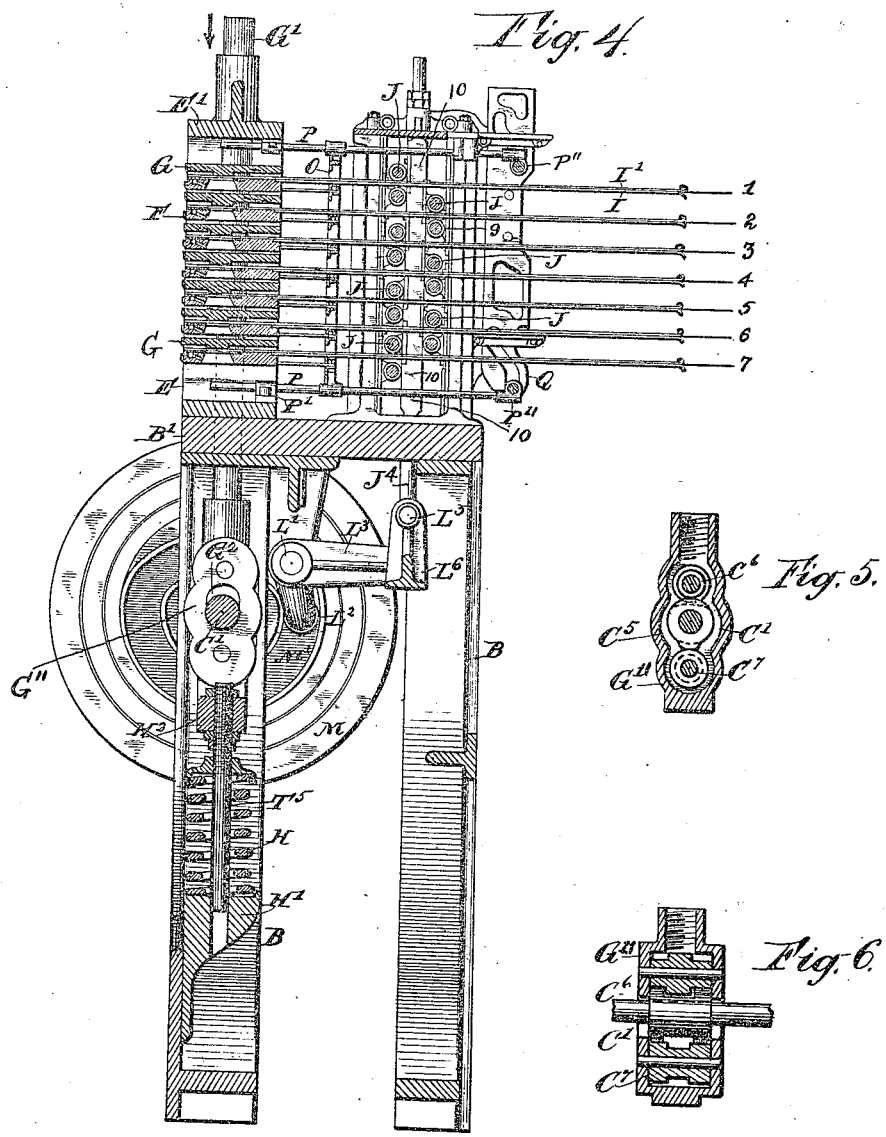

No. 644,762. Patented Mar. 6, 1900.
J. T. CARMODY.
MACHINE FOR MAKING EGG CASE FILLERS.
(Application filed Mar. 20, 1899.)
(No Model.) 9 Sheets—Sheet 5.
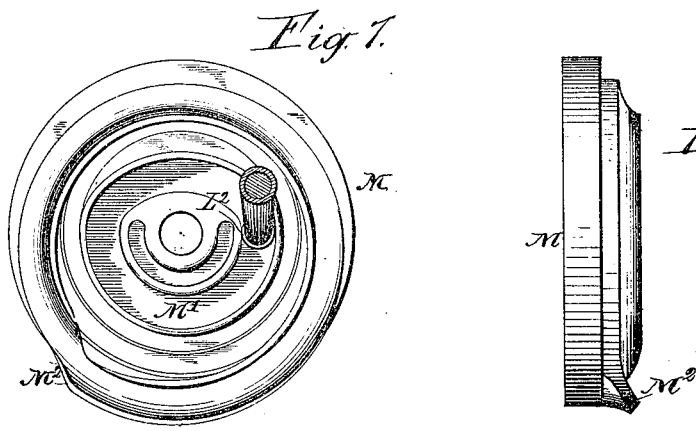
Fig. 7.
Fig. 8.
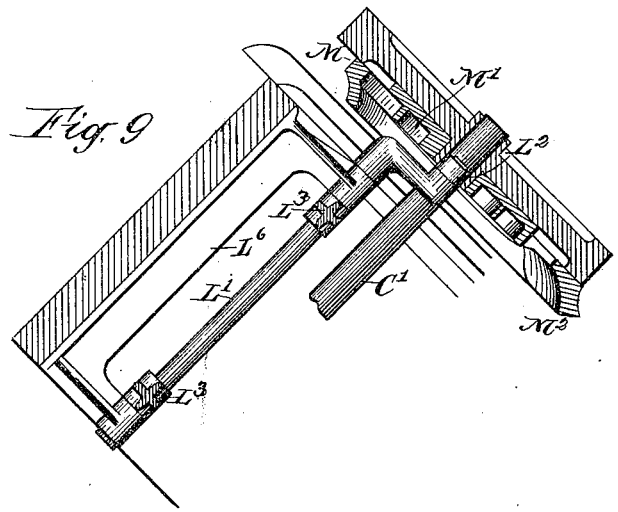
Fig. 9.
Witnesses.
Inventor No. 644,762. Patented Mar. 6, 1900.
J. T. CARMODY.
MACHINE FOR MAKING EGG CASE FILLERS.
(Application filed Mar. 20, 1899.)

(No Model.) 9 Sheets—Sheet 6.

Witnesses
Wm. M. Rheem
E. K. Barrett

Inventor
John T. Carmody
By Gidley & Hopkins
Attys.

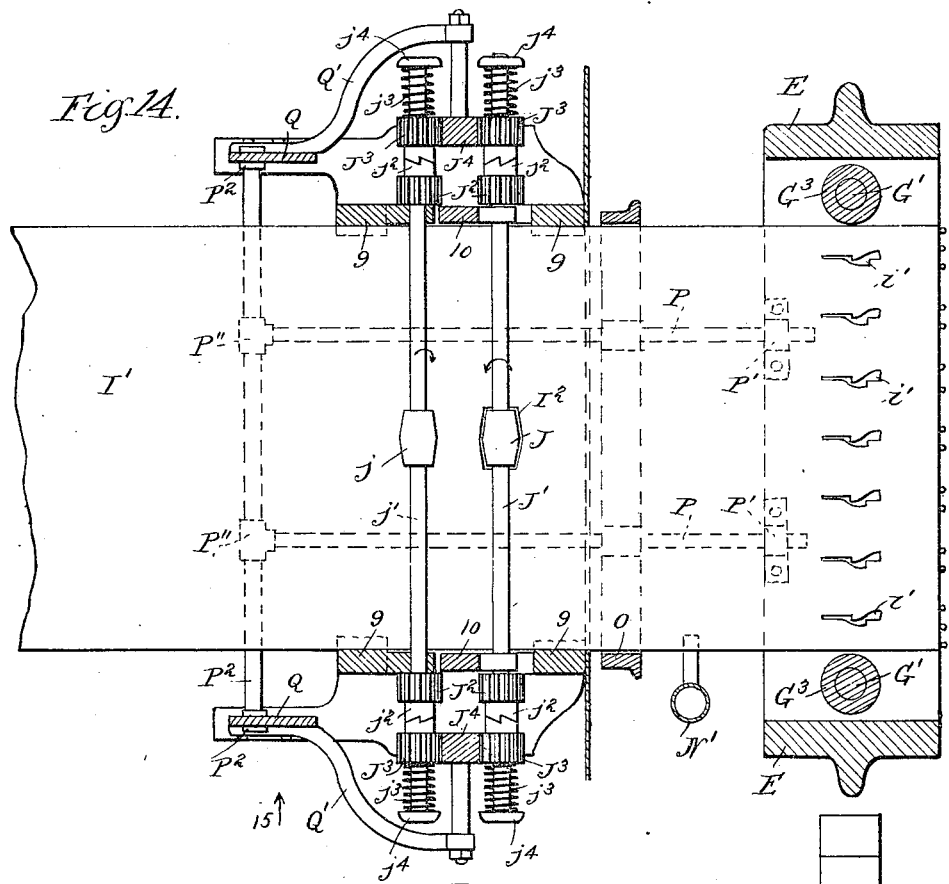
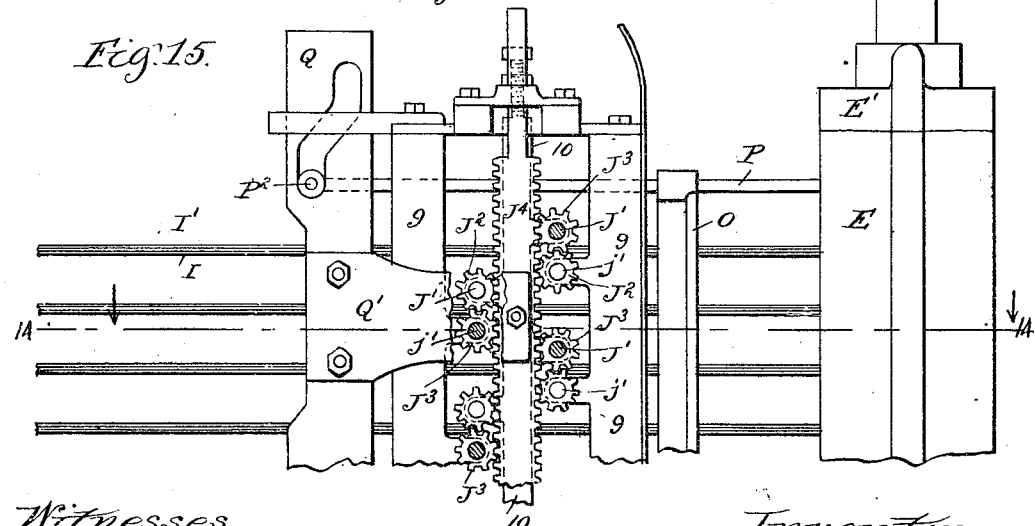

No. 644,762. Patented Mar. 6, 1900.
J. T. CARMODY.
MACHINE FOR MAKING EGG CASE FILLERS.
(Application filed Mar. 20, 1899.)
(No Model.) 9 Sheets—Sheet 8.

Witnesses.
Wm M. Rheem
E. R. Barett

Inventor
John T. Carmody
By Gridley & Hopkins
Attys.

No. 644,762. Patented Mar. 6, 1900.
J. T. CARMODY.
MACHINE FOR MAKING EGG CASE FILLERS.
(Application filed Mar. 20, 1899.)
(No Model.) 9 Sheets—Sheet 9.
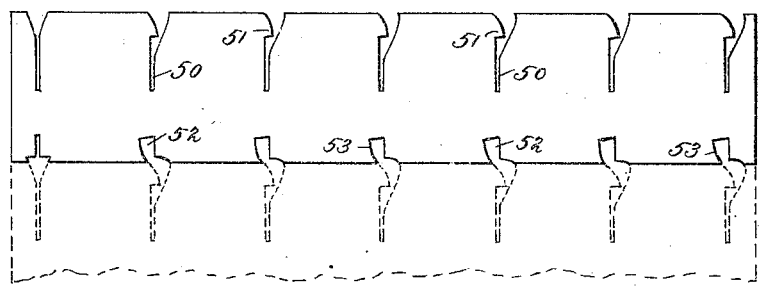
Fig. 19.
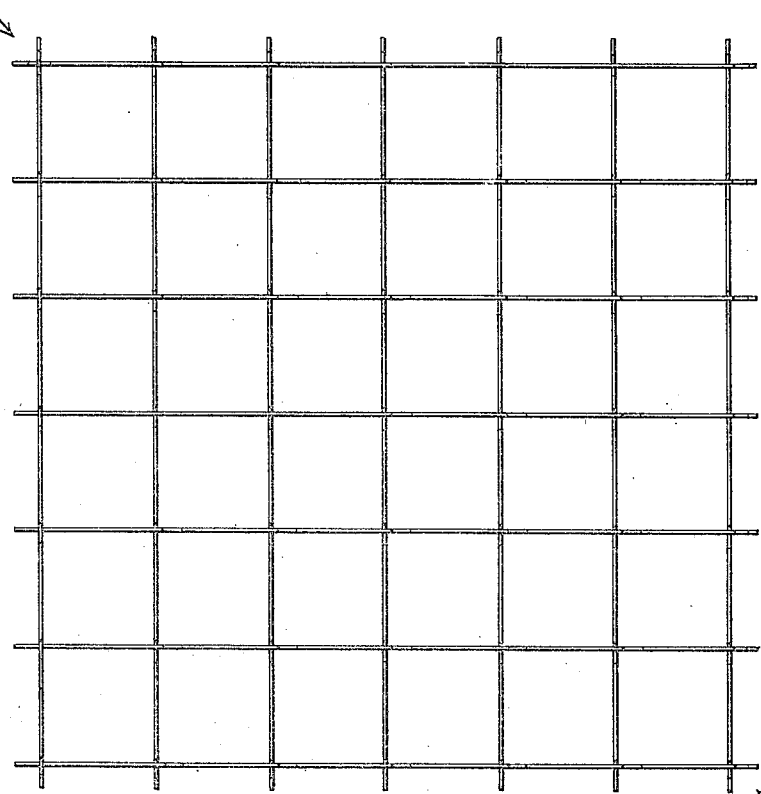
Fig. 20.
Fig. 21.
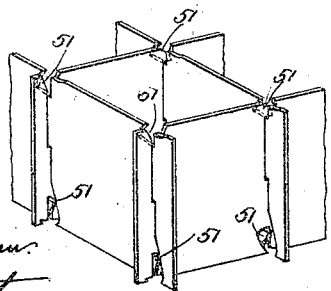
Witnesses.
Wm. M. Rheem
E. R. Bandt
Inventor
John T. Carmody
by Gridley & Hopkins
Attys.

UNITED STATES PATENT OFFICE.

JOHN T. CARMODY, OF CEDAR RAPIDS, IOWA, ASSIGNOR, BY MESNE ASSIGNMENTS, TO THE J. G. CHERRY COMPANY, OF SAME PLACE.

MACHINE FOR MAKING EGG-CASE FILLERS.

SPECIFICATION forming part of Letters Patent No. 644,762, dated March 6, 1900.

Application filed March 20, 1899. Serial No. 709,817. (No model.)

*To all whom it may concern:*

Be it known that I, JOHN T. CARMODY, a citizen of the United States, residing at Cedar Rapids, in the county of Linn and State of Iowa, have invented certain new and useful Improvements in Machines for Making Egg-Case Fillers, of which the following is a specification.

The subject of the present invention is a machine by which the fillers or cells for egg-cases are accurately and cheaply made. The strawboard or other material from which the fillers are to be made is fed to the machine in as many long sheets as there are to be strips in the filler, and each of these long sheets is equal in width to the length of the filler-strips to be made. The sheets are all simultaneously advanced to a certain position and then arrested until certain operations have been performed, whereupon they are again advanced a like distance, and so on intermittently during the operation of the machine. After the sheets have been advanced and have come to rest they are all simultaneously perforated a suitable distance from their ends, and each is severed upon a line passing through the row of perforations made at the immediately preceding operation of the dies. By thus severing the sheets the filler-strips are cut off from them, and by reason of the described location of the cut (through the row of perforations made at the preceding operation of the dies) each filler-strip will have slits or notches in its opposite edges. For a reason hereinafter described the slits or notches in one edge of the strip extend quite to the center thereof, while those in the opposite edge are shallower. In order to cut each of the sheets upon a line passing through the row of perforations made at the immediately-preceding operation of the dies, the cutters are placed in advance of the dies a distance equal to the width of a filler-strip, and by reason of this disposition of the parts at all times during the operation of the machine the ends of the sheets in the machine have the described slits or notches equal in depth to about one-half the width of the filler-strip. Each filler is made up of two sets of filler-strips. The sheets from which each set of strips is made are parallel with each other; but the sheets of one set intersect the planes of the sheets of the other set, the slits or notches aforesaid being so disposed that they fall at the intersections of the sheets. At each operation the sheets are advanced and projected past the cutters a distance equal to the width of a filler-strip, and in being thus advanced the two sets of sheets will interlock. Simultaneously with the advancing of the sheets two sets of oppositely-disposed grippers are also advanced, and at about the instant the advancing of the sheets ceases the grippers close upon the advanced and interlocked ends of the sheets, one set of grippers taking hold of one set of sheets and the other set of grippers taking hold of the other set of sheets. When the operation of advancing the sheets is completed, they are severed, as already described, thus producing the two sets of partially-interlocked strips of which the filler is made up. This done the grippers are retracted, and in being retracted they draw the severed strips of the two sets toward each other and complete the operation of interlocking them. This done the grippers open and recede and an arm sweeps the completed filler from its position between the two coöperating sections of the machine. These two sections of the machine are alike in construction and operation, each being adapted to complete one of the two sets of strips of which the filler is made up and to assist in interlocking the two sets, with the exception that one section is provided with the means for operating the arm that dislodges the completed filler. Hence for the sake of brevity and conciseness the following description will be confined to one section, excepting where it becomes necessary to refer to the other, corresponding parts of both being indicated by similar reference characters.

The invention consists in the features of novelty that are herein fully described.

In the accompanying drawings, which are made a part of this specification, Figure 1 is a side elevation of a machine for making an egg-case filler embodying the invention, a portion of the base at the right-hand side of the figure being broken away. Fig. 1ª is a side elevation of a fragment of the base, including the portion thereof which is not shown in Fig.

Figure 11:
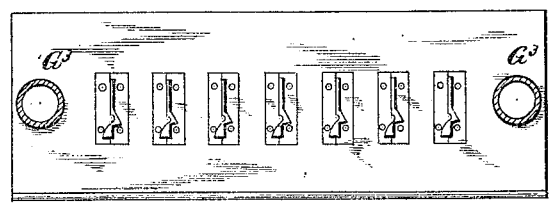
Figure 12:
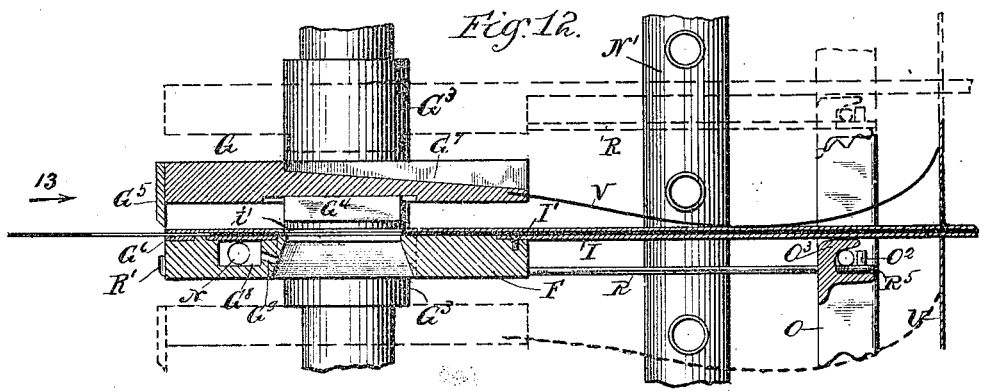
Figure 13:
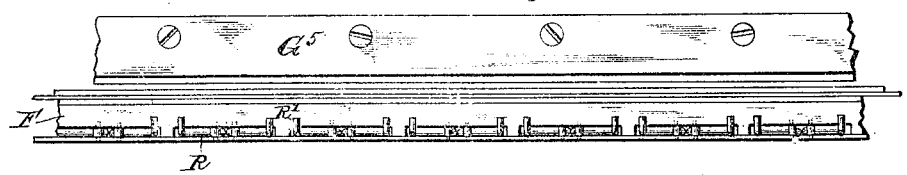
Figure 16:
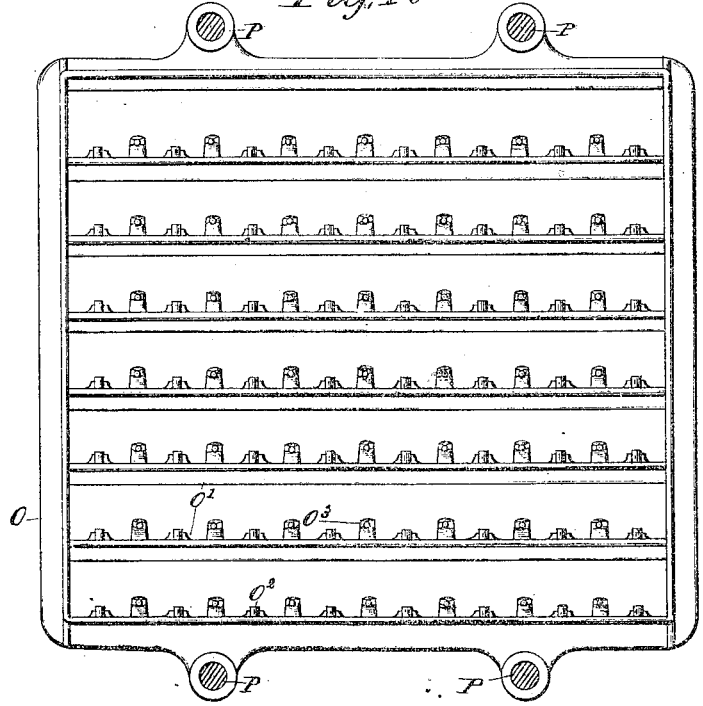
Figure 17:
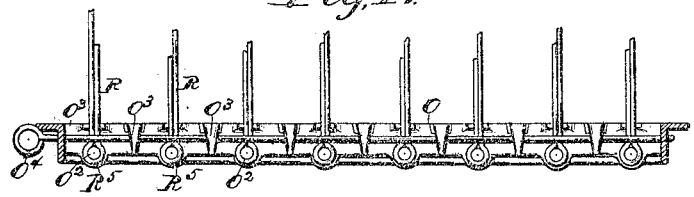
Figure 18:
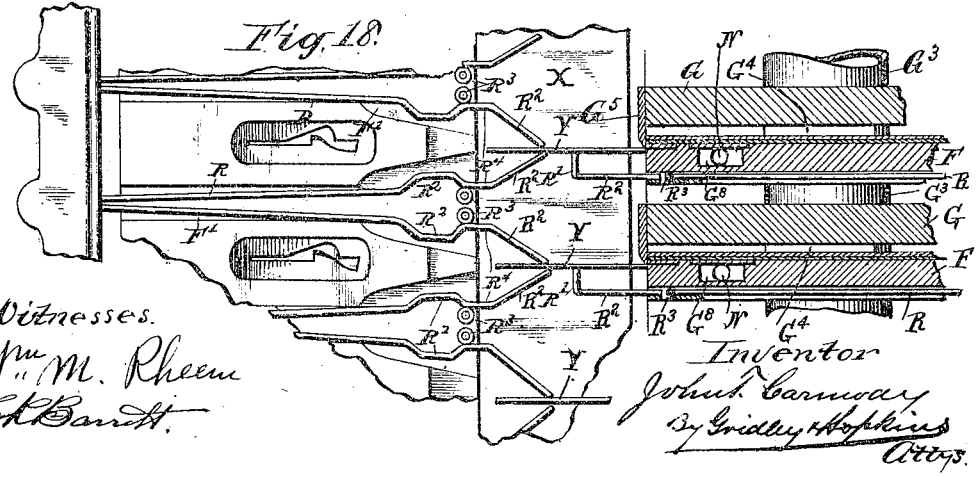

1. Fig. 2 is an elevation of a machine embodying the invention viewed in the direction of the arrow 2 in Fig. 1. In Fig. 2 portions of the base and frame of the machine are broken away. Fig. 3 is a sectional elevation of the machine on the line 3 3, Fig. 2, looking in the direction of the arrow. Fig. 4 is a section of one of the two similar sections of the machine upon the line 4 4, Fig. 3, looking in the direction of the arrow. Figs. 5 and 6 are sections in planes at right angles to each other, showing the cam and its accessories by which the movable members of the dies and the cutters are operated. Fig. 7 is a face view of the cam-wheel for operating the feed mechanism, for advancing and retracting the grippers, and for operating the arm for dislodging the completed fillers, a fragment of the crank which coöperates therewith being shown in sectional elevation. Fig. 8 is an edge view of the cam-wheel shown in Fig. 7. Fig. 9 is a sectional elevation of said cam-wheel and its accessories, the crank being shown in full elevation. Figs. 10 and 11 are elevations of opposite faces of one of the bars carrying the punches or male members of the dies. Fig. 12 is a sectional elevation, on a somewhat-larger scale, showing two adjacent bars carrying the coöperating members of one set or gang of dies in transverse section, a fragment of the rod for operating the bars carrying the movable members of the dies in elevation, one of the cutters in transverse section, a portion of one of the feed-tubes in longitudinal section, one of the grippers in elevation, a fragment of the gripper-operating frame partly in section and partly in elevation, and a fragment of the air-tube for dislodging the chips. Fig. 13 is an elevation of a portion of the mechanism shown in Fig. 12 viewed in the direction of the arrow 13, Fig. 12. Fig. 14 is a section on the line 14 14, Fig. 15, showing on a somewhat-larger scale the mechanism for feeding the sheets forward, one of the feed-tubes, the gripper-operating frame, the working extremities of one set of grippers, and one of the matrix-bars. Fig. 15 is an elevation of the mechanism shown in Fig. 14 viewed in the direction of the arrow 15, Fig. 14. Fig. 16 is a plan view of the gripper-operating frame of one of the machine-sections. Fig. 17 is a section thereof and an elevation of fragments of the stems of one gang of grippers. Fig. 18 is an enlarged sectional elevation of adjacent portions of the two sections of the machine, showing particularly the dies, the cutters, the grippers and their accessories, fragments of two filler-strips partly interlocked and in readiness to be completely interlocked by the withdrawal of the grippers being also shown. Fig. 19 is an elevation of one of the filler-strips, the position which it occupies with relation to the end of the sheet before it is severed therefrom being indicated by dotted lines. Fig. 20 is a plan view of a completed filler. Fig. 21 is a perspective of a fragment thereof on a larger scale.

On suitable bed-plates A are mounted the two main frames B for the two coöperating sections of the machine, said frames being of quadrant shape, or substantially so. One of these frames is securely bolted to its bed while the other is hinged to its bed at its outer lower corner, as shown more clearly in Fig. 1$^a$, so that it may be moved about its hinge to such position that free access may be had to its working face and to the working face of the other machine-section. While in their normal operating positions the working faces of those two machine-sections are separated by a space, as shown more clearly in Figs. 2 and 18, which is only slightly greater in width than the width of one of the filler-strips, and this space is not sufficient to give access to the parts at the working faces of the two machine-sections or adjacent thereto, and hence the necessity for providing means for moving one section away from the other. In order to facilitate this movement of one section away from the other, a shaft T' is journaled to the main frame of the movable section and is provided at one end with a crank T for turning it and at the other end with a beveled pinion $T^2$. This pinion meshes with correspondingly-beveled teeth on a nut $T^3$, which has a threaded eye and is turned onto a heavy screw $T^5$, the lower extremity of which is pivoted to the base A, as shown at $T^6$. The pinion $T^2$ and nut $T^3$ are confined by a yoke $T^4$, the upper branch of which is perforated for the passage of the screw $T^5$. With this arrangement by turning the crank T the nut $T^3$ will be caused to turn upon the screw $T^5$. The upward movement of the nut $T^3$ will be transmitted to the frame B through the pinion $T^2$, its shaft T', and the shaft, bearing, and thus the machine-section to which this mechanism is applied may be moved about its hinge.

The machine shown in the drawings is adapted to make fillers, each comprising fourteen interlocking strips disposed in two sets of seven each. Each of the fourteen strips is cut from a separate sheet of strawboard or similar material. The seven sheets of strawboard from which the strips of one set are cut are shown clearly in Figs. 2 and 4 and numbered 1 to 7, inclusive. Each of these sheets is fed forward through a long sheet-metal tube or chute, which is preferably made up of two sheet-metal plates I I', as shown more clearly in Figs. 12, 14, and 15. Both of the plates are attached to the bar F, which carries the matrices of one gang of dies, and, as shown more clearly in Figs. 12 and 14, the plate I' is carried quite to the forward edge of the bar and is provided with openings $i'$, registering with the openings of the matrices, whereby the plate I' is made to serve as a stripper for stripping the sheet of strawboard from the punches $G^4$. Each of the sheets of strawboard in the section of the machine which is in the foreground in Fig. 1 is represented by a single heavy line, and the positions of the sheets of strawboard in the other section of the machine are indicated by the intersecting dotted lines. Each of the sheets is fed forward intermittently by a pair of rolls J j, carried by shafts J' j', respectively, the tube or chute being provided in its opposite sides with openings I², through which the peripheries of the rolls are adapted to extend and engage the sheet. The shafts j' of the rolls j are journaled in short arms projecting from fixed portions 9 of the frame, while the shafts J' of the rolls J are journaled in short arms projecting in opposite directions from a pair of bars 10, located upon opposite sides of the chutes or tubes and so mounted as to be capable of limited endwise movement for the purpose of relatively adjusting the rolls of each pair. Thus one roll of each pair is adjustable relatively to its companion, and all of the adjustable rolls bear similar relations to the chutes. In order to enable the use of rolls of sufficient diameter, the several pairs are arranged in two parallel rows and staggered. All the shafts derive their movement from endwise reciprocable rack-bars J⁴, which are mounted in suitable bearings in the frame and are disposed between the two rows of shafts. Rigidly fixed to each of the shafts, near each end, is a pinion J², and these pinions J² of each pair of shafts intermesh, whereby the shafts are compelled to rotate in opposite directions, their adjacent sides always moving in the direction in which the sheets are to be fed. Rigidly fixed to one shaft of each pair, near each of its ends, is one member j² of a clutch, the other member of which is mounted loosely upon the shaft, so as to be capable of both rotary and endwise movement thereon, and this movable member of the clutch is held normally in engagement with the fixed member by a spring j³, interposed between the movable member and a shoulder or collar j⁴ on the shaft. The movable member of the clutch is carried by a pinion J³, which meshes with the teeth of the rack-bar J⁴. By this means when the rack-bar is moved in one direction it rotates all the movable members of the clutches. These in turn rotate the fixed members of the clutches, the shafts by which they are carried, and one of the pinions J² of each pair, and these latter in turn rotate the other of the pinions J² of each pair, and when the rack-bar moves in the opposite direction the movable members of the clutches will yield endwise, and thereby permit them to turn upon the shafts by which they are carried, leaving the shafts at rest. By reason of the fact that the rack-bar is disposed between the two rows of pinions J³, and therefore engages the pinions of the two rows at opposite sides, respectively, as to one row of shafts, it is necessary to place the pinions J³ upon the shafts that are located at one side of the tubes, respectively, and as to the other row of shafts it is necessary to place them upon the shafts that are located at the opposite sides, respectively, of the tubes—that is to say, as the parts appear in Figs. 2, 14, and 15 as to the vertical row of shafts at the right of the rack-bar J⁴ the pinions which engage the rack-bar are secured to the shafts that are above the tubes, while as to the row of shafts at the left of the rack-bar the pinions J³, engaging the rack-bar, are secured to the shafts that are below the tubes. In other words, referring again to Figs. 14 and 15, the rack-bar J⁴ is geared to the shafts J' of one row and to the shafts j' of the other row. The extremities of the rack-bars J⁴ are both connected to a cross-head L⁶, which in turn is hung from a shaft L⁵, said shaft being in turn supported by links L⁴, carried at the extremities of arms L³, projecting from a rock-shaft L', said shaft being provided with a crank-arm having an antifriction-roller L², occupying a cam-groove M' in the cam-wheel M. A portion of this cam-groove is concentric with the axis of the wheel, while the remainder is eccentric, the slope of the cam being about equally divided upon opposite sides of the cam's shortest radius, so that during a portion of the revolution of the cam-wheel M the rack-bars remain at rest, while during the remainder of the revolution they have a uniform to-and-fro movement. The cam-wheel M is secured to a shaft C', which carries a beveled pinion C², meshing with a corresponding pinion C³ on the main shaft C of the machine, the latter being provided with a pulley C⁴ for receiving a belt. The beveled pinions C³ for driving the shaft C' of the two sections of the machine are presented in opposite directions in order that the parts of the two sections shall move in opposite directions.

The extremities of the bars F are rigidly attached to equally-spaced shoulders E², formed on a pair of heavy posts E, which are securely fastened to a head-plate B' of the main frame B and have their upper extremities connected by a heavy bridge-plate E'. As shown more clearly in Fig. 12, these heavy bars F carry the matrices or female members of the dies, the male members or punches G⁴ of which are carried by heavy bars G, having their ends secured to a pair of rods G', mounted in suitable bearings, so as to be capable of endwise movement, the bars F being provided with openings for the free passage and endwise reciprocation of the rods. In order to secure the bars G to the rods G', the bars are provided with openings corresponding in diameter to the diameter of the rods, and on the rods between the bars G are disposed spacing-sleeves G³, the ends of which bear against the bars G and hold them at proper distances apart, the openings in the bars F being equal in diameter to the spacing-sleeves, so that the latter move freely endwise with the rods. Each of the rods G' is connected with a yoke G'', which incloses a cam C⁵, carried by the shaft C', and the yokes G'' are both connected by a heavy cross-head H², having a stem T⁵ slidably mounted in a socket formed in a fixed bracket H', surrounded by a heavy spring H, which exerts its pressure in one direction against the frame of the machine through the bracket H' and in the other direction against the rods G' through the medium of the cross-head H² and the yokes G''. The cams C⁵ are very short and are adapted to exert their pressure upon the yokes G'', through the medium of antifriction-rollers C⁶ and C⁷, the ends of the yokes being provided with slots G² to permit of their necessary movement relatively to the shaft C'. When the cams C⁵ engage these antifriction devices C⁷, the rods G' are moved in the direction of the arrow in Fig. 4 and all the bars G thereby advanced, causing the dies to perforate all of the sheets of strawboard, this action being in opposition to the force of the spring H, and as soon as the cams have passed the antifriction devices C⁷ the spring H will retract the bars G and withdraw the male members of the dies; or if the spring H is not sufficiently strong the cams will perform this operation when they reach the antifriction devices C⁶. The bars G are also provided with knives G⁵, which, in connection with the edges of the bars F or with plates G⁶ secured thereto and acting as ledger-blades, sever the projecting ends of the sheets.

The dies are preferably so shaped as to form perforations of the shape shown in the drawings, or substantially so. The parts of the feeding mechanism are so proportioned that at each operation the sheets will be advanced a distance equal to the width of a filler-strip, and the dies are so placed with relation to the cutter, that when the sheets come to rest after being fed forward the knives will cut them upon a line intersecting the perforations at about the place shown in Fig. 12 of the drawings and indicated by dotted lines in Fig. 19. The object of this is to provide each filler-strip in one of its edges with a number of deep slits or notches 50, which extend to the center of the strip and which have tongues 51 overhanging their straight inner portions, the outer edges of the tongues and the opposite edges of the notches or slits being cut off at an angle for the purpose of providing flaring entrances to the slits, well adapted for receiving the edges of the strips in the act of interlocking them. In the opposite edge of each strip are a number of shorter notches 52, adapted to accommodate the tongues 51 of the interlocking strips, the sides 53 of these slits being complementary to the tongues 51, or practically so, so that when the filler is folded by compressing it in the direction of the arrows in Fig. 20 the notches 52 will provide clearance for the tongues 51, and thereby permit the filler to be folded flat, or practically so.

By reason of the described construction and disposition of the two sections of the machines when the sheets are advanced in the manner described the deep notches or slits in the extremities of the several sheets carried by one section of the machine will fall opposite the deep notches or slits in the extremities of the several sheets carried by the other section of the machine, and the unsevered sheets will thereby be caused to interlock, as clearly shown in Fig. 18, where the process of making the filler has advanced to the point of severing the filler-strips X and Y from the sheets, leaving them supported between the two sections of the machine by the grippers. During the act of advancing, and thus interlocking the ends of the sheets, the two sets of grippers R (one set being carried by each section of the machine) will have advanced and taken hold of the projecting ends of the sheets, the set of grippers carried by each section of the machine taking hold of the sheets carried by the other section of the machine, as clearly shown in Fig. 18. As these grippers are retracted—that is, moved away from each other from the position shown in Fig. 18—they will draw the severed strips of one set in one direction and the severed strips of the other set in the opposite direction, thereby completing the operation of interlocking the strips of the filler. The grippers having been retracted, an arm S, pivoted to one section of the machine, as shown at S', will be thrown down against the filler and not only knock it from its position between the two sections of the machine, should it lodge there, but also fold it, as indicated by the arrows in Fig. 20. This arm S is operated by a cam M² on the wheel M engaging studs S² projecting from the hub of the arm, as shown more clearly in Figs. 1 and 2.

Each of the grippers comprises a pair of jaws having a normal tendency to separate and having cam-surfaces which are adapted to engage with fixed parts for the purpose of closing the jaws during the act of projecting them. Preferably the jaws and the arms carrying them are constructed of spring-wire bent to proper shape. As shown in the drawings, each piece of wire entering into the construction of these grippers is bent at its middle to form an eye R⁵, which fits over a stud O², projecting from one of the cross-bars O' of a rectangular frame O. This frame is preferably made of cast metal, and each of its cross-bars is provided with as many studs O² as there are grippers in each set or gang, and each cross-bar is also provided between the studs O² with hooks O³, behind which hooks a removable pin or rod O⁴ is placed, so that it engages the arms of the grippers in the vicinity of the eyes R⁵ and holds the eyes in place on the studs O². From the eyes R⁵ the two arms or branches of each piece of spring-wire diverge, so that their extremities enter into the construction of adjacent pairs of gripper-jaws. As shown at F', the back of each of the bars F is recessed to receive the arms of the gripper-jaws, and upon each of the bars F are mounted studs R³, which are preferably provided with antifriction devices disposed in position to engage cam-surfaces R² on the jaws, and thereby cause the jaws to close as they are projected. Back of the cam-surfaces R² the jaws or their stems are provided with straight portions R⁴, which hold the jaws closed a sufficient length of time to insure the complete interlocking of the filler-strips as the jaws are being retracted. During this retractile movement of the jaws, after the straight portions R⁴ have passed the studs R³, the cam-surfaces R² will permit the elastic arms of the jaws to separate them.

For the purpose of advancing and retracting the grippers the frame O is rigidly connected to four rods P, which are sustained against lateral displacement and at the same time permitted to move freely endwise by guides P'. The extremities of these rods P are connected by means of couplings P'' with a pair of heavy transverse rods P², the extremities of which occupy cam-grooves in a reciprocable cam-plate Q and are preferably provided with antifriction devices. The cam-plates are connected by means of bracket-arms Q' with the reciprocable rack-bars J⁴, so that the cam-plates partake of the movement of the rack-bars, and by this means the feeding forward of the sheets and the advancing of the grippers take place simultaneously, the cam-grooves in the plates Q being so shaped that the grippers will reach the limit of their forward movement before the operation of feeding the sheets forward is completed, and thereafter the grippers will remain at rest until, during the return movement of the rack-bars J⁴, the oblique portions of the cam-slots in the plates Q reach the rods P² and move them laterally, thereby retracting the grippers. Referring again to Figs. 10 and 12, it will be seen that each of the bars G is provided in its back with depressions G⁷, which are disposed opposite the openings or matrices in the bars F in position to receive the chips that are punched out of the strawboard by the dies. From these depressions the chips are blown by jets of air discharged against them through ducts G⁹, leading to the openings or matrices of the bar F from a longitudinal channel G⁸ in said bar, the extremities of said channel being suitably connected with a pipe N, leading from some suitable blast apparatus. From the depressions G⁷ the chips are blown into the space between one of the tubes or chutes I I' and a flexible apron V, one edge of which is attached to the bar G, while the other edge rests upon a plate or diaphragm U, which is disposed back of the reciprocable gripper-frame O and is continuous, save that it is provided with slots, as shown in Fig. 12, for the passage of the sheets of strawboard. From these spaces, one for each set or gang of dies, the chips are blown by air-currents directed into them from a pipe N', located at the high side of the machine.

What I claim as new, and desire to secure by Letters Patent, is—

1. In a machine of the class described, the combination of means for simultaneously forming all of the filler-strips necessary for a complete egg-case filler and providing all of said strips with notches or slits in their edges, means for bringing said strips together in two sets with the strips of each set in planes that are parallel with each other and that intersect the planes of the strips of the other set, and with their notches at their points of intersection, and means for thereafter simultaneously advancing all of the strips of each set while in their respective planes toward the strips of the other set, whereby at each operation of the machine a complete egg-case filler is made, substantially as set forth.

2. In a machine of the class described, the combination of means for holding as many sheets or blanks as there are filler-strips in the complete egg-case filler, said sheets or blanks being arranged in two sets with the sheets of each set in planes that are parallel with each other and that intersect the planes of the sheets of the other set, means for providing all of the sheets, at their points of intersection, with marginal slits or notches, means for advancing all of the sheets in their respective planes until the sheets of one set partially interlock with the sheets of the other set, means for simultaneously severing a complete set of filler-strips from each set of sheets, and means for simultaneously drawing the severed strips of one set toward the severed strips of the other set and thereby completely interlocking the two sets of filler-strips thus formed, substantially as set forth.

3. In a machine of the class described, the combination of means for holding as many sheets or blanks as there are filler-strips in the complete egg-case filler, said sheets or blanks being arranged in two sets with the sheets of each set in planes that are parallel with each other and that intersect the planes of the sheets of the other set, a number of dies arranged in as many gangs or sets as there are sheets or blanks and adapted to simultaneously perforate all of the sheets of both sets at a given distance from their ends, a cutter arranged in advance of each gang or set of dies, said cutters being adapted to simultaneously sever all of the sheets of both sets upon the lines of the perforations made at the next preceding operation of the dies whereby each strip of each set is provided with a marginal notch or slit, means for operating the dies and cutters, means for feeding all of the sheets or blanks forward a distance equal to the width of a filler-strip after each operation of the dies and cutters and thereby causing their notched ends to interlock in advance of the next operation of the cutters, and means for simultaneously advancing toward each other all the filler-strips of the two sets thus made and severed by the dies and cutters, substantially as set forth.

4. In a machine of the class described, the combination of means for holding a number of sheets or blanks, a number of dies arranged in as many gangs or sets as there are sheets and with the several gangs or sets in line with each other, whereby they are adapted to perforate all of the sheets of both sets at a given distance from their ends, means for feeding all of the sheets forward a distance equal to the width of a filler-strip after each operation of the dies, and a number of cutters, one for each sheet, adapted to sever all of the sheets upon the lines of the perforations made by the dies, substantially as set forth.

5. In a machine of the class described, the combination of a means for holding a number of sheets or blanks, a plurality of fixed and movable bars arranged alternately, coöperating die members carried by said bars, respectively, means for moving one set of bars toward and from the other set, means for feeding a sheet of material between the coöperating die members of each pair of bars, and means for severing the sheets upon the lines of the perforations made by the dies, substantially as set forth.

6. In a machine of the class described, the combination of a plurality of fixed and movable bars arranged alternately, a gang of die members carried by each of the bars, the die members of one bar being adapted to coöperate with the die members of the adjacent bar, means for moving the movable bars toward and from the fixed bars, a number of cutters, one carried by each of the movable bars and adapted to coöperate with the adjacent fixed bar for severing the sheets, and means for intermittently advancing the sheets, substantially as set forth.

7. In a machine of the class described, the combination of a plurality of fixed bars each having a plurality of matrices, a plurality of movable bars, alternating with the fixed bars, each having a plurality of punches, means for imparting lateral reciprocation to the movable bars, a knife carried by each of the movable bars adapted to coöperate with a ledger-blade on the adjacent fixed bar, sheet-feeding tubes each having its forward end secured to one of the fixed bars, and means for intermittently feeding sheets of material through said tubes, substantially as set forth.

8. In a machine of the class described, the combination with means for severing filler-strips from a number of sheets of strawboard or the like, of means for intermittently feeding forward the sheets of strawboard, said feeding means comprising a pair of rolls adapted to engage each sheet, intermeshing pinions carried by the shafts of each pair of rolls, a second pinion carried by the shaft of one roll of each pair, a movable clutch member carried by said pinion, a fixed clutch member carried by the shaft and adapted to coöperate with the movable clutch member, a rack-bar engaging the pinions last aforesaid, and means for reciprocating the rack-bar, substantially as set forth.

9. In a machine of the class described, the combination with means for forming and severing filler-strips from a number of sheets, of means for intermittently feeding forward said sheets, said feeding means comprising a tube for each sheet having openings in its opposite sides, a pair of rolls for each sheet adapted to engage the sheet through the openings in the tube, intermeshing pinions carried by the shafts of each pair of rolls, a fixed clutch member carried by one shaft of each pair of rolls, a movable clutch member mounted to slide and rotate upon said shaft, a pinion movable with said movable clutch member, a rack-bar engaging the movable pinion, and means for reciprocating the rack-bar, substantially as set forth.

10. In a machine of the class described, the combination with means for forming and severing filler-strips from a number of sheets, of means for feeding forward the sheets, said feeding means comprising a pair of rolls for each sheet, said pairs of rolls being arranged in parallel rows and staggered, and means for rotating all of the rolls intermittently, substantially as set forth.

11. In a machine of the class described, the combination with means for forming and severing filler-strips from a number of sheets, of means for intermittently feeding forward the sheets, said means including a pair of rolls for each sheet, said rolls being arranged in parallel rows, shafts carrying the rolls, a reciprocable rack-bar arranged between the two rows of shafts, a pinion carried by one shaft of each pair and meshing with the rack-bar, right and left clutch members carried by said pinions, coöperating clutch members carried by the shafts, and intermeshing pinions, whereby rotation is transmitted from one shaft of each pair to the other, substantially as set forth.

12. In a machine of the class described, the combination with a gang of coöperating die members and means for actuating them, of means for discharging a blast of air in the vicinity of the matrices for dislodging the chips, substantially as set forth.

13. In a machine of the class described, the combination of a number of coöperating die members comprising punches and matrices arranged in sets or gangs, and a number of relatively-movable bars carrying said die members, the bars that carry the matrices being provided with air-channels having discharge-openings directed into the matrices, and means for discharging air into said channels, substantially as set forth.

14. In a machine of the class described, the combination of two relatively-movable bars, means for relatively moving them, a set of punches carried by one of them, a set of matrices carried by the other and adapted to coöperate with the punches, one of said bars being provided with an air-channel having discharge-openings directed toward the places where the chips are discharged from the matrices, and means for discharging air into said channel, substantially as set forth.

15. In a machine of the class described, the combination of a number of coöperating die members arranged in separate sets or gangs, means for operating said die members, means for feeding a sheet of material to each of the sets or gangs of coöperating die members, and means for discharging jets of air into the spaces between the several sheets being fed to the die members, substantially as set forth.

16. In a machine of the class described, the combination with a number of coöperating die members arranged in separate sets or gangs, means for operating them, and means for feeding a sheet of material to each set or gang of die members, of means for directing jets of air against the chips as they fall from the dies for blowing them into the space between the sheets that are being fed to the dies, and means for directing jets of air into the spaces between said sheets, substantially as set forth.

17. In a machine of the class described, the combination with coöperating die members arranged in a plurality of sets or gangs, a pair of relatively-movable bars carrying the coöperating die members of each set, and means for feeding sheets of material to the several sets or gangs of die members, of flexible aprons each having one of its edges connected to one of the bars aforesaid, a plate against which the other edge of said apron bears, said plate being adapted to close the spaces between the sheets of material, and means for discharging currents of air into the spaces between said aprons and sheets, substantially as set forth.

18. In a machine of the class described, the combination of two machine-sections having means for holding as many separate sheets or blanks as there are strips in the egg-case filler, said sheets or blanks being arranged in two sets, one carried by each machine-section, with the sheets of each set in planes that are parallel with each other and that intersect the planes of the sheets of the other set, means for simultaneously feeding the two sets of sheets forward, intermittently, means for providing the ends of all of the sheets of each set, at their intersections with the sheets of the other set, with notches, means for severing a filler-strip from each sheet, and means for simultaneously interlocking the two sets of filler-strips thus formed, substantially as set forth.

19. The combination with the feeding, punching, cutting and interlocking mechanism substantially as described, said mechanisms being disposed in two groups adapted to make and assemble the parts of a filler between them, of a swinging arm adapted to move in the space between the two groups of mechanisms, and means for swinging such arm for the purpose of dislodging the completed filler, substantially as set forth.

20. In an egg-case-filler machine, the combination of a number of fixed and movable bars arranged alternately, coöperating die members carried by the bars, a pair of rods, means for connecting the rods with all of the movable bars, yokes connected with the rods, cams disposed within the yokes and adapted to move the rods endwise, and a spring adapted to move the rods in one direction and hold them in normal positions, substantially as set forth.

21. In a machine of the class described, the combination of means for forming all of the filler-strips necessary for a complete egg-case filler, said strips having notches or slits in their edges, means for bringing said strips together in two sets with the strips of each set in planes that are parallel with each other and that intersect the planes of the strips of the other set, and with their notches at their points of intersection, two sets of grippers, each set of being adapted to grip the filler-strip of one of the two sets, and means for advancing and retracting the grippers, substantially as set forth.

22. In a machine of the class described, the combination with means for holding two sets of sheets with the sheets of each set in planes that are parallel with each other and that intersect the planes of the sheets of the other set, means for notching the sheets at their points of intersection, means for advancing the sheets so as to partly interlock them, and means for severing a set of filler-strips from each set of sheets, of two sets of grippers, each set being adapted to grip the filler-strips of one of the two sets; means for advancing and retracting the grippers, and means for opening and closing their jaws, substantially as set forth.

23. In a machine of the class described, the combination of two machine-sections, each having means for holding a set of sheets, means for perforating the sheets, cutters for severing filler-strips from the sheets, means for advancing the sheets and arresting them in such positions that the cutters will intersect the perforators aforesaid, a set of grippers, means for advancing and retracting the grippers, a means for opening and closing their jaws, the grippers of each machine-section being adapted to grip the filler-strips made by the other machine-section, substantially as set forth.

24. In a machine of the class described, the combination with two machine-sections, each having means for making a set of filler-strips, of a set of grippers carried by each machine-section and adapted to grip the filler-strips made by the other machine-section, each of said grippers having a pair of spring-actuated jaws, arms carrying the jaws and having cam-surfaces, means for advancing and retracting the grippers, and means for engaging the cam-surfaces aforesaid for operating the jaws, substantially as set forth.

25. In a machine of the class described, the combination with two machine-sections each having means for making a set of filler-strips, of a set of grippers carried by each machine-section, a movable part by which the grippers are carried, means for imparting reciprocating movement to said part whereby the grippers are advanced and retracted, a means whereby the movement aforesaid is caused to operate the jaws of the grippers, substantially as set forth.

26. In a machine of the class described, the combination with the bars, F, having matrices, the bars, G, having dies, the cutters carried by the bars, G, means for advancing the sheets between the bars, F and G, means for reciprocating the bars F, grippers having arms disposed between the bars F and G, means for imparting reciprocating movement to the arms of the grippers, and means for converting said reciprocating movement and operating the jaws of the grippers, substantially as set forth.

27. In a machine of the class described, the combination of the bars, F, having matrices, the bars, G, having dies, cutters carried by the bars, G, means for reciprocating the bars, G, means for advancing the sheets between the bars, F and G, grippers having arms disposed between the bars F and G, a reciprocable frame to which the arms of the grippers are attached, means for reciprocating said frame whereby the arms of the grippers are reciprocated endwise, and means for converting the endwise-reciprocating movement of the grippers and thereby operating their jaws, substantially as set forth.

28. In a machine of the class described, the combination of two machine-sections each having means for making a set of filler-strips and each having a set of grippers adapted to grip the set of filler-strips made by the other machine-section, and means for operating said grippers, said operating means including a reciprocable frame having cross-bars, provided with studs, and hooks, and rods supported by the hooks and engaging the arms of the grippers, the grippers and their arms being formed of lengths of spring metal bent to form eyes for receiving the studs, substantially as set forth.

JOHN T. CARMODY.

Witnesses:
WALTER L. CHERRY,
A. T. COOPER.